(12) United States Patent
Alfekri et al.

(10) Patent No.: US 8,709,554 B2
(45) Date of Patent: Apr. 29, 2014

(54) PRINTABLE AND PRINTED ARTICLES

(75) Inventors: Dheya M. Alfekri, San Diego, CA (US); Ronald J. Selensky, Poway, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 287 days.

(21) Appl. No.: 13/046,976

(22) Filed: Mar. 14, 2011

(65) Prior Publication Data

US 2012/0237699 A1 Sep. 20, 2012

(51) Int. Cl.
*B41M 5/00* (2006.01)
*B41M 5/52* (2006.01)
*B41M 5/50* (2006.01)
*D06P 5/30* (2006.01)

(52) U.S. Cl.
CPC ........... *B41M 5/5218* (2013.01); *B41M 5/5254* (2013.01); *B41M 5/506* (2013.01); *B41M 5/52* (2013.01); *D06P 5/30* (2013.01)
USPC .................. 428/32.16; 428/32.24; 428/32.25; 428/32.34

(58) Field of Classification Search
CPC ..... D06P 5/30; B41M 5/5218; B41M 5/5254; B41M 5/506; B41M 5/52
USPC ....... 428/32.16, 32.24, 32.25, 32.34
See application file for complete search history.

(56) References Cited

U.S. PATENT DOCUMENTS

| | | | |
|---|---|---|---|
| 6,511,736 B1 * | 1/2003 | Asano et al. ............... | 428/195.1 |
| 7,037,590 B2 | 5/2006 | Rische et al. | |
| 7,112,629 B2 | 9/2006 | Niu et al. | |
| 7,261,921 B1 | 8/2007 | Hillhouse-Aubry | |
| 7,273,651 B1 | 9/2007 | Wilde | |
| 7,615,265 B2 | 11/2009 | Stork et al. | |
| 7,638,176 B2 | 12/2009 | Kasperchik et al. | |
| 2002/0080216 A1 * | 6/2002 | Dowell et al. ................... | 347/85 |
| 2003/0064208 A1 | 4/2003 | Yamada et al. | |
| 2003/0077429 A1 | 4/2003 | Schulz | |
| 2005/0048230 A1 | 3/2005 | Dalvey et al. | |
| 2006/0045999 A1 | 3/2006 | Chen et al. | |
| 2006/0046030 A1 | 3/2006 | Shiba | |

(Continued)

FOREIGN PATENT DOCUMENTS

| | | |
|---|---|---|
| DE | 3102409 A1 | 8/1982 |
| EP | 1403089 B1 | 8/2006 |
| JP | 2009196106 A | 9/2009 |

OTHER PUBLICATIONS

Coatings Textiles and Nonwovens, Building Better Nonwovens, Sep. 2003, copyright 2003 Rohm and Haas Company, 12 pages, printed in U.S.A.

(Continued)

*Primary Examiner* — Betelhem Shewareged

(57) ABSTRACT

Printable articles including a substrate, an image receiving layer over the substrate, and a barrier layer between the substrate and the image receiving layer are useful in the production of fine art reproductions. The image receiving layer comprises at least one pigment and two or more binders, wherein at least one of the two or more binders has a glass transition temperature (Tg) at least 20° C. less than a Tg of at least one other of the two or more binders. Printed articles including a printable article with marking material contained in the image receiving layer may exhibit a textured cracking pattern after application and drying of the marking material or a liquid laminate.

20 Claims, 3 Drawing Sheets

(56) References Cited

U.S. PATENT DOCUMENTS

| | | |
|---|---|---|
| 2008/0090033 A1* | 4/2008 | Fu et al. .................. 428/32.39 |
| 2008/0254240 A1 | 10/2008 | Niu et al. |
| 2010/0173128 A1 | 7/2010 | Rotenberg et al. |

OTHER PUBLICATIONS

<http-//www.artsheaven.com/oil-painting-reproductions-aged-cracked-craquelure.html> "Aged & Cracked (Craquelure) Paintings" (PDF web page, 6 pages).

* cited by examiner

PRINTABLE AND PRINTED ARTICLES

BACKGROUND

Fine art reproductions are often generated using commercial imaging devices, such as large-format inkjet printers, for example. It is often desirable to reproduce a textured cracking pattern on the image to simulate the natural cracking of paints in older paintings. Reproducing a cracking pattern with an inkjet image has traditionally been performed using mechanical means to either cut or emboss a cracking pattern in the finished article. However, this approach does not last long enough and adds to the process complexity. Alternatively, cracking can be induced if the printable surface, often called an inkjet receptive coating (IRC), is produced with sufficient thickness. However, such thickness-induced cracking is prone to flaking of the IRC, which can lead to poor image quality.

For the reasons stated above, and for other reasons that will become apparent to those skilled in the art upon reading and understanding the present specification, there is a need in the art for alternative printable articles.

DETAILED DESCRIPTION

In the following detailed description of the present embodiments, reference is made to the accompanying drawings that form a part hereof, and in which is shown by way of illustration specific embodiments of the disclosure which may be practiced. These embodiments are described in sufficient detail to enable those skilled in the art to practice the subject matter of the disclosure, and it is to be understood that other embodiments may be utilized and that process, chemical or mechanical changes may be made without departing from the scope of the present disclosure. The following detailed description is, therefore, not to be taken in a limiting sense.

Various embodiments include printable articles. Generally, such printable articles include a substrate, an image receiving layer (e.g., a coating, such as in inkjet receptive coating) over the substrate, and a barrier layer between the substrate and the image receiving layer (e.g., a gesso layer). The barrier layer can serve to reduce the porosity of the substrate, thereby aiding the image receiving layer from bonding directly to the porous substrate, such as the fibers of a canvas substrate, for example. The barrier layer may further facilitate improvements in structural integrity or optical properties of the printable article. For example, a gesso layer applied to a canvas substrate can serve to improve stiffness of the printable article and to improve its whiteness and hadleability for further steps like printing, laminating and framing.

The image receiving layer of various embodiments includes at least one pigment and two or more binders. The binders have glass transition temperatures (Tg) chosen to induce cracking in the image receiving layer in response to the application of liquid marking material, e.g., dye or pigment-based inks, and/or the application of a liquid laminate, e.g., a protective coating applied after application of the marking material. It is believed that the application of the marking materials and/or the liquid laminate causes such image receiving layers to swell (e.g., expand) through the absorption of water or other solvents found in these materials, and that upon drying, uneven shrinkage of the image receiving layer produces seemingly random cracking patterns, such as might be seen in drying mud. It is further believed that allowing such image receiving layers to bond to a porous substrate, such as fibers of a canvas substrate, would serve to mitigate, or even eliminate, the cracking sought in the various embodiments. In particular, desired cracking was not seen in various tests using image receiving layers in accordance with embodiments of the disclosure formed directly on a canvas substrate without a barrier layer.

Figure 1A:
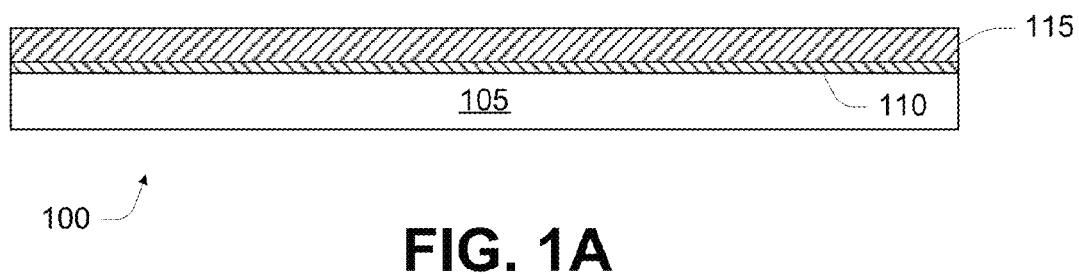
FIGS. 1A-1D depict a printable article in accordance with an embodiment of the disclosure at various stages of use to produce a printed article.

FIG. 1A depicts a printable article 100 in accordance with an embodiment of the disclosure. The printable article 100 includes a substrate 105. For one or more embodiments, the substrate 105 includes a fibrous substrate, such as fabric, paper or the like. Fabrics can include, but are not limited to, natural and synthetic fabrics, such as woven and nonwoven canvas, cloth, cotton, hemp, rope, flax, linen, wool, rayon, nylon, polyester, natural and artificial silk, acetate, polyamide, denim, blends thereof, and combinations thereof.

The printable article 100 further includes a barrier layer 110. The barrier layer 110 includes one or more materials used to reduce the porosity of the substrate 105. For example, a gesso coating may be applied to the substrate 105 as the barrier layer 110. A gesso coating is generally one or more binders and one or more pigments. Traditionally, gesso contained animal glue and chalk, gypsum or the like. More commonly, gesso describes acrylic binder, such as an acrylic polymer, and pigment, such as calcium carbonate, titanium dioxide or the like. Other materials may be suitable for the barrier layer 110. For example, the barrier layer 110 may include an extruded resin layer, such as an extruded polyolefin layer, e.g., an extruded polyethylene, polyvinylbutyral, or polypropylene layer. For one or more embodiments, the barrier layer 110 is impervious to the image receiving layer 115.

The printable article 100 further includes the image receiving layer 115. The image receiving layer 115 includes at least one pigment and two or more binders. For one or more embodiments, the image receiving layer 115 may have a coating weight from 10 grams per square meter (gsm) to 70 gsm or more. For additional embodiments, the image receiving layer 115 has a coating weight from 10 gsm to 70 gsm.

The binders of image receiving layer 115, used to bind the pigment together, can include, but are not limited to, water soluble polymers (e.g., polyvinyl alcohol, cationic polyvinylalcohol, acetoacetylated polyvinylalcohol, silylated polyvinylalcohol, carboxylated polyvinylalcohol, poly(vinylalcohol-ethylene oxide) copolymer, polyvinylpyrrolidone, copolymer of poly(vinylacetate vinylpyrrolidone), copolymer of poly(vinylalcohol-vinylpyrrolidone), cationic polyvinylpyrrolidone, gelain, hydroxyethylcellulose, methyl cellulose), water dispersible polymers, and emulsion polymers (e.g., styrene butadiene copolymers, styrene acrylic copolymers, styrene methacrylic copolymers, styrene acrylic methacrylic copolymers vinyl acrylic polymers, all acrylic polymers, all methacrylic polymers, polyurethane dispersions, polyester dispersions, and combinations thereof). In an embodiment, the binder is a latex binder (e.g., the latex binder includes acrylic polymers, methacrylic polymers, styrene-acrylic copolymers, styrene-methacrylic copolymers, styrene-acrylic-methacrylic copolymers, and combinations thereof). Specific non-limiting examples include RHOPLEX GL-618 (Tg=36° C.) and PRIMAL SB-100 (Tg=−10° C.), both acrylic polymer emulsions available from Rohm and Haas Co., Philadelphia, Pa.

For one or more embodiments, at least one of the two or more binders has a glass transition temperature at least 20° C. less than a glass transition temperature of at least one other of the two or more binders. For another embodiment, at least one of the two or more binders has a glass transition temperature at least 30° C. less than a glass transition temperature of at least one other of the two or more binders.

For a further embodiment, at least one of the two or more binders has a glass transition temperature less than 25° C. and at least one other of the two or more binders has a glass transition temperature greater than 25° C. For a still further embodiment, at least one of the two or more binders has a glass transition temperature less than 10° C. For a still further embodiment, at least one of the two or more binders has a glass transition temperature less than 0° C.

For various embodiments, the pigments may include hollow polymer pigments (e.g., hollow beads) and the like, that include one or more voids within the outer dimension of the pigment volume. The hollow beads may have an inner void volume from about 20% to 70% as applied, and less when the hollow beads are in a dry condition. For one or more embodiments, the hollow beads may have a diameter from about 0.1 to 10 μm. For one or more embodiments, the hollow beads may have a glass transition temperature (Tg) from 30° C. to 120° C.

The hollow beads can be derived from chemicals such as, but not limited to, styrene monomers, acrylic monomers, methacrylic monomers, isoprene (e.g., latex), acid monomers, non-ionic monoethylenically unsaturated monomers, polyethylenically unsaturated monomer, and combinations thereof.

The acid monomers can include, but are not limited to, acrylic acid, methacrylic acid, and mixtures thereof; and acryloxypropionic acid, methacryloxypropionic acid, acryloxyacetic acid, methacryloxyacetic acid, and monomethyl acid itaconate. The non-ionic monoethylenically unsaturated monomers can include, but are not limited to, styrene and styrene derivatives (e.g. alkyl, chloro- and bromo-containing styrene), vinyltoluene, ethylene, vinyl esters (e.g. vinyl acetate, vinylformate, vinylacetate, vinylpropionate, vinylbenzoate, vinylpivalate, vinyl 2-ethylhexanoate, vinyl methacrylate, vinyl neodecanoate, and vinyl neononanoate), vinyl versatate, vinyl laurate, vinyl stearate, vinyl myristate, vinyl butyrate, vinyl valerate, vinyl chloride, vinylidene chloride, acrylonitrile, methacrylonitrile, acrylamide, (meth)acrylamide, t-butylacrylamide, t-butyl methacrylamide, isopropylarylamide, isopropylmethacrylamide, and $C_1$-$C_{20}$ alkyl or $C_3$-$C_{20}$ alkenyl esters of (meth)acrylic acid.

The expression (meth)acrylic acid is intended to serve as a generic expression embracing both acrylic acid and methacrylic acid (e.g., methyl methacrylate, t-butylmethacrylate, methyl acrylate, ethyl(meth)acrylate, butyl(meth)acrylate, 2-ethyl hexyl(meth)acrylate, benzyl(meth)acrylate, lauryl (meth)acrylate, oleyl(meth)acrylate, palmityl(meth)acrylate, stearyl(meth)acrylate, hydroxyl containing (meth)acrylate, (e.g., hydroxyethylacrylate, hydroxyethylmethacrylate, hydroxypropylacrylate, hydroxypropylmethacrylate, and 2,3-Dihydroxypropyl methacrylate)). Polyethylenically unsaturated monomers can include, but are not limited to, ethylene glycol di(meth)acrylate, allyl(meth)acrylate, 1,3-butane-diol di(meth)acrylate, diethylene glycol di(meth) acrylate, trimethylol propane trimethacrylate, and divinyl benzene.

In various embodiments, the pigments can include, but are not limited to, acrylic or styrene acrylic polymer emulsions, such as ROPAQUE ULTRA, ROPAQUE HP-543, ROPAQUE HP-643, ROPAQUE BC-643, ROPAQUE HP-1055, or ROPAQUE OP-96 (available from Rohm and Haas Co., Philadelphia, Pa.) or carboxylated styrene/acrylate copolymers (e.g., Dow plastic pigment HS 2000NA, or Dow plastic pigment 3000NA), or carboxylated styrene/butadiene copolymer (e.g., Dow Latex HSB 3042NA), available from Dow Chemical Co., Midland, Mich.

The image receiving layer 115 is configured to receive ink (dye and/or pigment based), at least in part, by interactions between the ink and the pigment and/or the binder of the image receiving layer 115. In addition, the ink may be received within the pores provided by the hollow beads of such pigments, and by the space between hollow beads.

For one or more embodiments, the one or more pigments of the image receiving layer 115 may be 40 to 80 dry weight % of the image receiving layer 115. For a further embodiment, the one or more pigments of the image receiving layer 115 may be at least 50 dry weight % of the image receiving layer 115. For one or more embodiments, the two or more binders of the image receiving layer 115 may be 20 to 60 dry weight %. For a further embodiment, the two or more binders of the image receiving layer 115 may be at least 40 dry weight % of the image receiving layer 115.

In some embodiments, the image receiving layer 115 may further include microporous and/or mesoporous inorganic particles having a large surface area. The microporous and/or mesoporous inorganic particles may be bound in the two or more binders of the image receiving layer 115. The microporous and/or mesoporous inorganic particles may include, but are not limited to, silica, silica-magnesia, silicic acid, sodium silicate, magnesium silicate, calcium silicate, alumina, alumina hydrate, barium sulfate, calcium sulfate, calcium carbonate, magnesium carbonate, magnesium oxide, kaolin, talc, titania, titanium oxide, zinc oxide, tin oxide, zinc carbonate, pseudo-boehmite, bentonite, hectorite, clay, and mixtures thereof. A non-limiting example includes SYLOID W500 silica gel available from W.R. Grace & Co., Columbia, Md.

Various embodiments of the image receiving layer 115 may further includes other components that do not materially affect the basic and novel properties of the image receiving layer 115. For example, the image receiving layer 115 may further include non-polymer pigments, biocides, surfactants, additional layers, etc.

Image receiving layer 115 may be formed of a liquid coating material applied over the barrier layer 110, such as by roll-coating, conventional slot-die processing, blade coating, bent-blade coating, rod coating, shear-roll coating, reverse-roll coating, slot-die cascade coating, pond coating, curtain coating, air-knife coating, gravure coating, size-pressing coating, brushing coating, and/or other comparable methods suitable for coating a substrate. The applied coating may then be dried to form the image receiving layer 115. Table 1 presents example ranges of formulations for a liquid coating suitable for producing an image receiving layer 115 in accordance with various embodiments of the disclosure. Note that weight percent, as used herein, refers to the total weight from a particular component or class of components as a percent of the total weight of liquid coating used to form the image receiving layer 115, i.e., before drying of the coating. Dry weight percent, as used herein, refers to the weight of solids from a particular component or class of components as a percent of the total weight of the image receiving layer 115 after drying.

TABLE 1

Example Formulation Ranges

| Material | % Solids | Weight % |
|---|---|---|
| ROPAQUE ULTRA | 30.36 | 40-55 |
| ROPAQUE BC-643 | 28.46 | 10-25 |
| PRIMAL SB-100 | 35.1 | 0.5-5 |
| RHOPLEX GL-618 | 46.99 | 20-40 |
| SYLOID W500 | 67.45 | 0-10 |
| Water | 0 | 0-10 |

It has been noted that cracking patterns and density can be varied by adjusting the ratios of relatively softer (e.g., lower Tg) binders to relatively firmer (e.g., higher Tg) binders. In addition, higher levels of the one or more pigments, particularly hollow polymer pigments, generally lead to higher cracking density. Similarly, higher coating weights in accordance with various embodiments are generally expected to produce higher cracking densities. Incorporation of relatively softer binders is thought to improve adhesion of the image receiving layer 115 to the barrier layer 110, e.g., after cracking is induced, to facilitate improved structural integrity of a printed article.

Figure 1B:
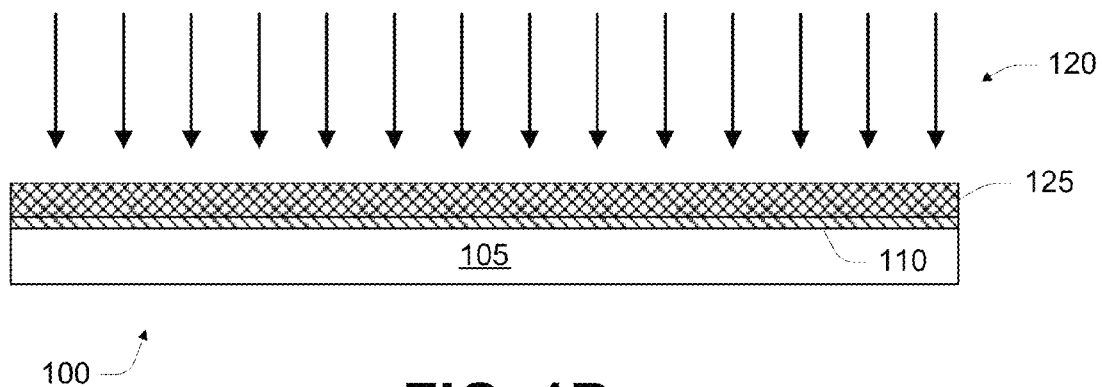

FIG. 1B depicts the printable article 100 of FIG. 1A receiving a marking material, represented by arrows 120. Multiple colors of marking material 120 are typically applied one color at a time in serial fashion as is well understood in the area of inkjet printing. For example, the marking material 120 may be one color of a four-color system, such as cyan, yellow, magenta and black. Alternatively, the marking material 120 may be one color of a six-color system, such as cyan, light cyan, yellow, magenta, light magenta and black. Other color systems are possible. For various embodiments, marking material 120 is an aqueous or solvent-based ink, containing either pigment or dye to define its color.

As one or more colors of marking material 120 are received in the image receiving layer 115, an image layer 125 is produced. The image layer 125 comprises the image receiving layer 115 and received marking material 120 contained therein. The printable article 100 may alternatively be referred to as a printed article upon receiving the marking material 120.

The marking material 120 may cause swelling of the image receiving layer 115, i.e., the image layer 125, due to absorption of water or other solvent from marking material 120. In particular, the absorption of water or other solvent can swell the polymers of the binders and/or polymer pigments of an image receiving layer 115.

Figure 1C:
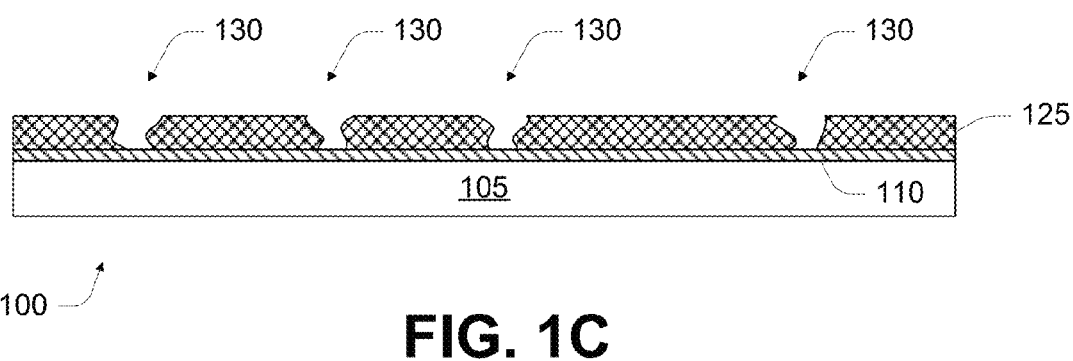

FIG. 1C depicts the printable article 100 of FIG. 1B after drying according to one or more embodiments. Where marking material 120 causes the image layer 125 (i.e., image receiving layer 115 with marking material 120) to swell, drying of the image layer 125, through the evaporation of the water or other solvent, can cause uneven shrinkage, leading to the formation of cracks 130, thereby forming a textured cracking pattern in the image layer 125.

Figure 1D:
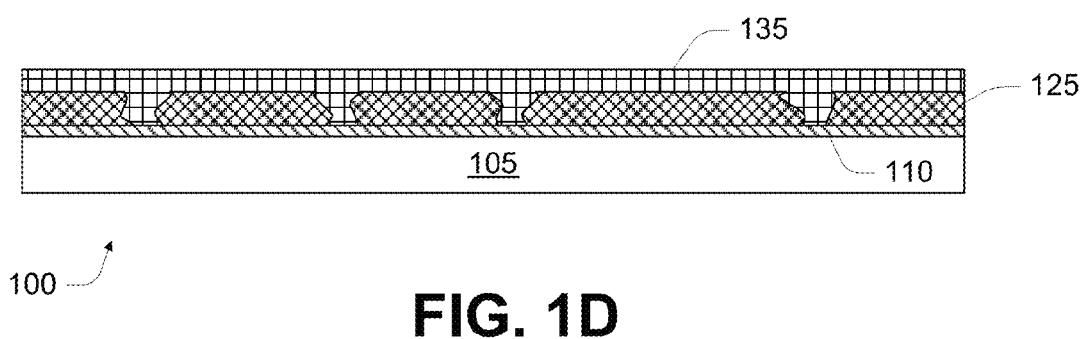

FIG. 1D depicts the printable article 100 of FIG. 1C after application of a laminate 135. The laminate 135 is generally a protective layer. The laminate 135 is generally applied as an aqueous or solvent-based liquid. Although not depicted in the figures, swelling of the image layer 125 can also be caused by water or other solvent of the laminate 135 being absorbed by the image layer 125, with subsequent uneven shrinkage upon drying causing cracking as described in relation to the marking material 120. Any cracking resulting from the laminate 135 can be in addition to cracking resulting from the marking material 120, or may be the sole source of cracking where marking material 120 causes insufficient swelling to induce cracking. A non-limiting example of a liquid laminate is CLEARSHIELD, an aqueous emulsion of acrylic urethane copolymers, available from ClearStar LP, Charlston, S.C.

Figure 2:
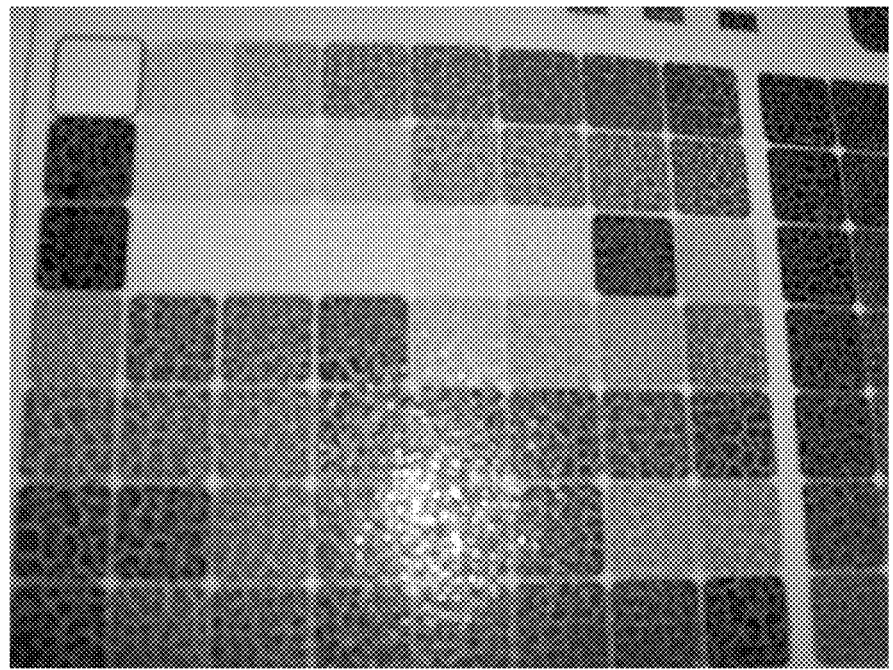
FIG. 2 is a picture demonstrating cracking patterns produced on a printable article in accordance with an embodiment of the disclosure.

FIG. 2 is a picture demonstrating cracking patterns produced on a printable article in accordance with an embodiment of the disclosure. FIG. 2 represents test image areas of differing colors printed on an image receiving layer in accordance with an embodiment of the disclosure. FIG. 2 shows that the cracking patterns produced thereby appear to be substantially independent of the applied color of marking material.

Figure 3:
FIG. 3 is a picture demonstrating cracking patterns produced on a printable article in accordance with an embodiment of the disclosure.

FIG. 3 is a picture demonstrating cracking patterns produced on a printable article in accordance with an embodiment of the disclosure. FIG. 3 represents an example image printed on an image receiving layer in accordance with an embodiment of the disclosure. FIG. 3 demonstrates the antique appearance, i.e., the textured cracking pattern, that can be produced using a printable article of the type described herein without resorting to subsequent mechanical cutting or embossing.

In some examples, the cracking pattern and severity can also be vary and controlled depending on the type of pigmented ink used in a printer. Beside the particle size of the ink pigment ranging from about 80 to about 120 nm, the composition of the ink also effect cracking. In some examples, the ink with binders and small drop size gives less ink cracking. For examples, HP DJ5500 printer tends to induce the most cracking. However, the HP DJ Z6100 and the B9180 and even Epson 9800 all produce minor and not easy to notice cracking.

Although specific embodiments have been illustrated and described herein, it will be appreciated by those of ordinary skill in the art that any arrangement that is calculated to achieve the same purpose may be substituted for the specific embodiments shown. Many adaptations of the embodiments will be apparent to those of ordinary skill in the art. Accordingly, this application is intended to cover any adaptations or variations of the embodiments.

What is claimed is:

1. A printable article, comprising:
   a substrate;
   an image receiving layer over the substrate; and
   a barrier layer between the substrate and the image receiving layer;
   wherein the image receiving layer comprises at least one pigment and two or more binders; and
   wherein at least one of the two or more binders has a glass transition temperature (Tg) at least 20° C. less than a Tg of at least one other of the two or more binders, an amount of the at least one other binder being 4 times to 80 times an amount of the at least one binder having the at least 20° C. lower Tg.

2. The printable article of claim 1, further comprising:
   wherein the at least one of the two or more binders has a Tg of less than 25° C.; and
   wherein the at least one other of the two or more binders has a Tg of greater than 25° C.

3. The printable article of claim 1, wherein the at least one of the two or more binders has a Tg at least 30° C. less than the at least one other of the two or more binders.

4. The printable article of claim 1, wherein the at least one of the two or more binders has a Tg of less than 10° C.

5. The printable article of claim 1, wherein the at least one of the two or more binders has a Tg of less than 0° C.

6. The printable article of claim 1, wherein the two or more binders comprise dried acrylic polymer emulsions.

7. The printable article of claim 1, wherein image receiving layer comprises 20-60 dry weight % of the two or more binders.

8. The printable article of claim 1, wherein image receiving layer comprises 40-80 dry weight % of the at least one pigment.

9. The printable article of claim 1, wherein the image receiving layer has a coating weight of 10-70 gsm.

10. The printable article of claim 1, wherein the substrate is a fibrous substrate.

11. The printable article of claim 1, wherein the at least one pigment comprises at least one hollow polymer pigment.

12. The printable article of claim 11, wherein the at least one hollow polymer pigment comprises a dried acrylic or styrene acrylic polymer emulsion.

13. The printable article of claim 1, wherein the barrier layer is impervious to a liquid coating used to form the image receiving layer.

14. The printable article of claim 1, wherein the image receiving layer further comprises microporous and/or mesoporous inorganic particles.

15. A printable article, comprising:
a fibrous substrate;
an image receiving layer over the fibrous substrate; and
a barrier layer between the fibrous substrate and the image receiving layer;
wherein the image receiving layer comprises at least one polymer pigment and two or more polymer binders; and
wherein at least one of the two or more polymer binders has a glass transition temperature (Tg) at least 20° C. less than a Tg of at least one other of the two or more polymer binders; and
wherein at least one of the two or more polymer binders has a glass transition temperature (Tg) of less than 10° C., the at least one polymer binder having the Tg of less than 10° C. being in a range of 0.5 to 5 percent (%) by weight, the at least one other polymer binder being in a range of 20 to 40% by weight, the % by weight being of total wet weight of the image receiving layer.

16. The printable article of claim 15, wherein image receiving layer comprises at least 40 dry weight % of the two or more polymer binders.

17. The printable article of claim 15, wherein image receiving layer comprises at least 50 dry weight % of the at least one polymer pigment.

18. The printable article of claim 15, wherein the at least one polymer pigment comprises hollow beads.

19. A printed article, comprising:
a substrate;
an image receiving layer over the substrate;
a barrier layer between the substrate and the image receiving layer; and
marking material contained in the image receiving layer, thereby forming an image layer comprising the image receiving layer and the marking material;
wherein the image receiving layer comprises at least one pigment and two or more binders;
wherein at least one of the two or more binders has a glass transition temperature (Tg) at least 20° C. less than a Tg of at least one other of the two or more binders; and
wherein the printed article exhibits a textured cracking pattern in the image layer.

20. The printed article of claim 19, further comprising a liquid laminate over the image layer.

* * * * *